US011005655B2

(12) United States Patent
Montero

(10) Patent No.: US 11,005,655 B2
(45) Date of Patent: May 11, 2021

(54) SYSTEM AND METHOD OF PROVIDING INFORMATION TO A DEVICE

(71) Applicant: Dell Products L.P., Round Rock, TX (US)

(72) Inventor: Adolfo Sandor Montero, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 162 days.

(21) Appl. No.: 16/176,378

(22) Filed: Oct. 31, 2018

(65) Prior Publication Data
US 2020/0136823 A1   Apr. 30, 2020

(51) Int. Cl.
H04L 9/30 (2006.01)
H04L 9/08 (2006.01)
H04L 9/06 (2006.01)

(52) U.S. Cl.
CPC .......... H04L 9/3066 (2013.01); H04L 9/0643 (2013.01); H04L 9/0861 (2013.01)

(58) Field of Classification Search
CPC ... H04L 9/3066; H04L 9/0861; H04L 9/0643; H04L 9/3239; H04L 9/3252
See application file for complete search history.

(56) References Cited

U.S. PATENT DOCUMENTS

| 4,567,600 | A | 1/1986 | Massey et al. |
| 4,587,627 | A | 5/1986 | Omura et al. |
| 5,854,759 | A | 12/1998 | Kaliski, Jr. et al. |
| 6,049,671 | A * | 4/2000 | Slivka .............. G06F 8/61 717/173 |
| 6,212,279 | B1 | 4/2001 | Reiter et al. |
| 6,243,467 | B1 | 6/2001 | Reiter et al. |
| 6,252,960 | B1 | 6/2001 | Seroussi |
| 6,563,928 | B1 | 5/2003 | Vanstone et al. |
| 6,782,100 | B1 | 8/2004 | Vanstone et al. |
| 8,261,327 | B2 | 9/2012 | Keeler et al. |
| 10,185,595 | B1 * | 1/2019 | Ramatchandirane ............. G06F 9/5061 |

(Continued)

OTHER PUBLICATIONS

FIPS PUB 186-4, Federal Information Processing Standards Publication, Digital Signature Standard (DSS), Issued Jul. 2013, 130 pages, Jul. 2013.

(Continued)

Primary Examiner — Ali S Abyaneh
(74) Attorney, Agent, or Firm — Baker Botts L.L.P.

(57) ABSTRACT

In one or more embodiments, one or more systems, methods, and/or processes may provide, to a device coupled to an information handling system, a request for salt data; may receive the salt data from the device; may determine a first position in an application that is executed by at least one processor of the information handling system; may determine a second position in the application, different from the first position; may determine a hash value of the application between the first position and the second position; may encrypt, utilizing a private encryption key, the salt data and the hash value as encrypted data; may provide the encrypted data to a buffer associated with the application; may retrieve the encrypted data from the buffer; and may provide the encrypted data to the device.

19 Claims, 9 Drawing Sheets

(56) References Cited

U.S. PATENT DOCUMENTS

| | | | | |
|---|---|---|---|---|
| 2007/0140488 A1* | 6/2007 | Dharmaji | ........... | H04N 21/8355 380/212 |
| 2010/0034382 A1* | 2/2010 | Xu | ........... | H04L 9/3252 380/255 |
| 2011/0103771 A1* | 5/2011 | Choo | ........... | H04N 21/4334 386/259 |
| 2014/0089117 A1* | 3/2014 | Schumacher | ........... | G06Q 20/40 705/21 |
| 2014/0298040 A1* | 10/2014 | Ignatchenko | ........... | G06F 21/72 713/192 |
| 2015/0016417 A1* | 1/2015 | Dees | ........... | H04W 88/08 370/331 |
| 2020/0057861 A1* | 2/2020 | Ujvari | ........... | G06F 21/64 |

OTHER PUBLICATIONS

Standards for Efficient Cryptography—Sec 2: Recommended Elliptic Curve Domain Parameters, Jan. 27, 2010, Version 2.0, 37 pages, Jan. 27, 2010.

Elliptic Curve Cryptography (ECC) Brain pool Standard Curves and Curve Generation by M. Lochter et al., ISSN: 2070-1721, Mar. 2010, 27 pages, Mar. 2010.

Applied Cryptography—Protocols, Algorithms, and Source Code in C by Bruce Schneier, Second Edition, 662 pages.

* cited by examiner

SYSTEM AND METHOD OF PROVIDING INFORMATION TO A DEVICE

BACKGROUND

Field of the Disclosure

This disclosure relates generally to information handling systems and more particularly to information handling systems providing information to devices.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one or more embodiments, one or more systems, methods, and/or processes may provide, to a device coupled to an information handling system, a request for salt data; may receive the salt data from the device; may determine a first position in an application that is executed by at least one processor of the information handling system; may determine a second position in the application, different from the first position; may determine a hash value of the application between the first position and the second position; may encrypt, utilizing a private encryption key, the salt data and the hash value as encrypted data; may provide the encrypted data to a buffer associated with the application; may retrieve the encrypted data from the buffer; and may provide the encrypted data to the device.

In one or more embodiments, the one or more systems, methods, and/or processes may further combine the salt data and the hash value. In one or more embodiments, encrypting the salt data and the hash value as the encrypted data may include utilizing an elliptic curve cryptographic process to encrypt the salt data and the hash value as the encrypted data. In one or more embodiments, determining the first position in the application may include searching for a marker within the application. For example, the marker may include at least one of a universally unique identifier (UUID) and a globally unique identifier (GUID). In one or more embodiments, searching for the marker within the application may include searching for the marker within the application starting at an address of an instruction pointer of at least one processor of an information handling system.

In one or more embodiments, one or more systems, methods, and/or processes may receive, from an information handling system, a request for salt data; may, in response to receiving the request for the salt data from the information handling system, generate the salt data; may provide the salt data to the information handling system; may receive encrypted data from the information handling system; may decrypt the encrypted data to determine decrypted data; may determine that the decrypted data includes the salt data; may, in response to determining that the decrypted data includes the salt data, determine, from the decrypted data, a hash value of at least a portion of an application of the information handling system; may determine that a data structure includes the hash value; may receive instructions from the application; and may store the instructions via the memory medium. In one or more embodiments, receiving instructions from the application may be performed in response to determining that the data structure includes the hash value. In one or more embodiments, storing the instructions via the memory medium may be performed in response to determining that the data structure includes the hash value.

In one or more embodiments, one or more systems, methods, and/or processes may receive, from an information handling system, a request for salt data; may, in response to receiving the request for the salt data from the information handling system, generate the salt data; may provide the salt data to the information handling system; may receive encrypted data from the information handling system; may decrypt the encrypted data to determine decrypted data; may determine that the decrypted data includes the salt data; may, in response to determining that the decrypted data includes the salt data, determine, from the decrypted data, a hash value of at least a portion of an application of the information handling system; may determine that a data structure includes the hash value; may receive information from the application; and may perform an action based at least on the information from the application. In one or more embodiments, receiving the information from the application and/or performing the action based at least on the information from the application may be performed in response to determining that the data structure includes the hash value.

In one or more embodiments, the data structure may store multiple hash values that includes the hash value. For example, determining that the data structure includes the hash value may include comparing the hash value with one or more of the multiple hash values until the hash value is matched to one of the multiple hash values. In one or more embodiments, the salt data may include at least one of a random number and a pseudo-random number, among others. In one or more embodiments, decrypting the encrypted data to determine the decrypted data may include utilizing a public encryption key that is associated with a private encryption key that was utilized to produce the encrypted data. In one or more embodiments, the one or more systems, methods, and/or processes may further encrypt a session key with the public encryption key to produce an encrypted session key. In one or more embodiments, the one or more systems, methods, and/or processes may further provide the encrypted session key to the application. In one or more embodiments, the one or more systems, methods, and/or processes may further communicate, utilizing the session key, information with the application.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

Figure 1:
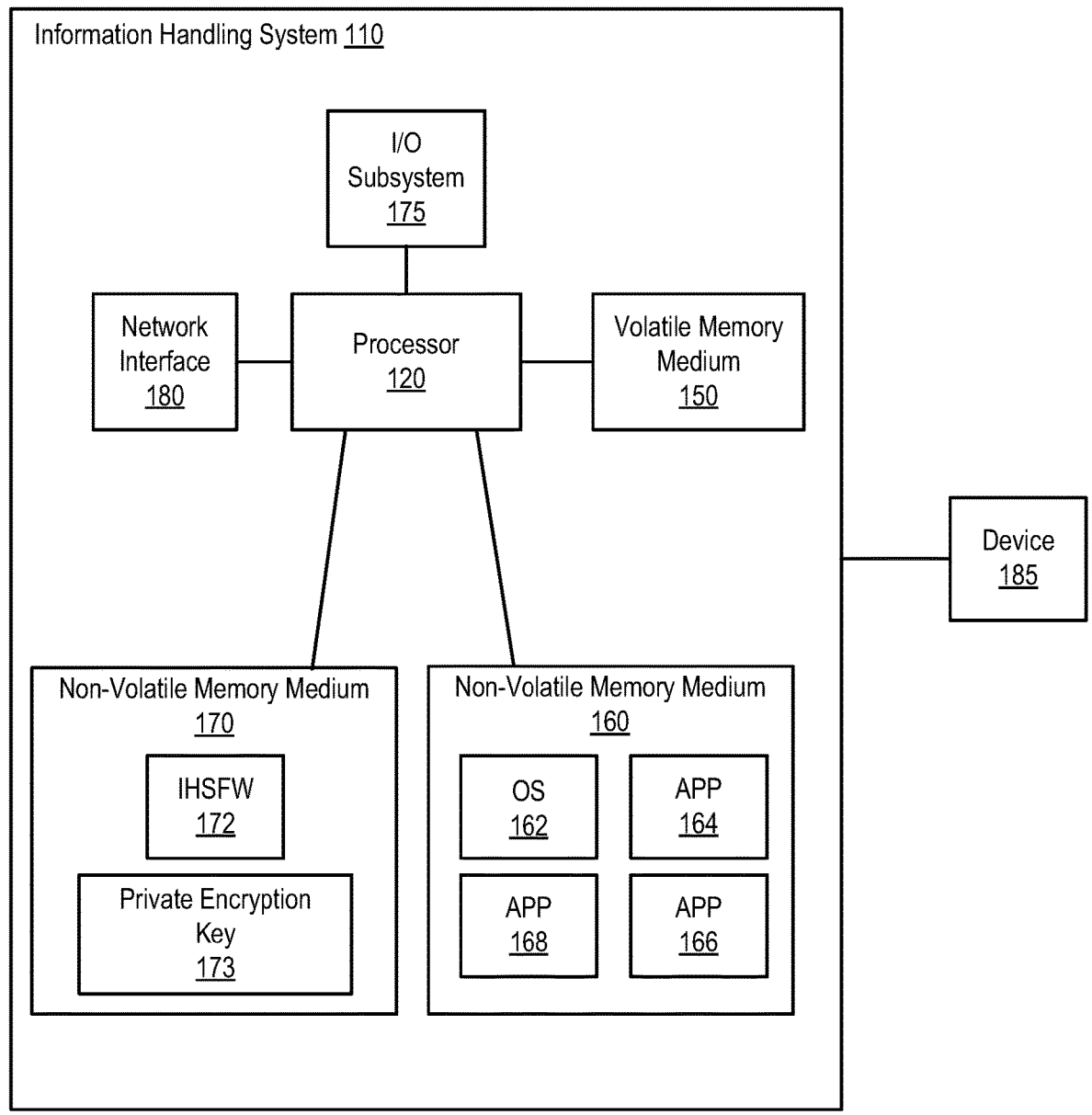
FIG. 1 illustrates an example of an information handling system, according to one or more embodiments.

In the following description, details are set forth by way of example to facilitate discussion of the disclosed subject matter. It should be apparent to a person of ordinary skill in the field, however, that the disclosed embodiments are examples and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

In one or more embodiments, an application may provide firmware to a device. For example, a communications medium between an information handling system and the device may permit firmware to be provided to the device. In one instance, the application may not be trusted to provide firmware to the device. In another instance, the application may be trusted to provide firmware to the device. In one or more embodiments, one or more authentication processes and/or methods may be performed to determine that the application may be trusted to provide firmware to the device. In one or more embodiments, the application may request to be trusted to provide firmware to the device. In one or more embodiments, determining that the application may be trusted to provide firmware to the device may include performing one or more measurements of the application. For example, the one or more measurements of the application may be or include one or more real-time measurements of the application. In one or more embodiments, a measurement of an application may include determining a hash value associated with the application. For example, a hash value associated with the application may be or include a hash value of at least a portion of the application. For instance, a hash value of at least a portion of the application may include a hash value of bytes of the application.

In one or more embodiments, the application requesting to be trusted to provide firmware to the device may provide salt data. In one example, the salt data may include a random number. In a second example, the salt data may include a pseudo-random number. In another example, the salt data may include a nonce (e.g., an arbitrary number that may be used once). In one or more embodiments, the application may receive the salt data from the device. In one or more embodiments, the salt data and the hash value of the at least the portion of the application may be encrypted to produce encrypted data. For example, the salt data and the hash value of the at least the portion of the application may be concatenated, and a concatenation of the data and the hash value of the at least the portion of the application may be encrypted to produce encrypted data. For instance, the salt data and the hash value of the at least the portion of the application may be encrypted with a private encryption key to produce encrypted data.

In one or more embodiments, the encrypted data may be provided to the application. For example, providing the encrypted data to the application may include providing the encrypted data to a buffer associated with the application. In one or more embodiments, the application may provide the encrypted data to the device. In one or more embodiments, the device may decrypt the encrypted data to produce decrypted data. For example, the device may decrypt the encrypted data with a public encryption key to produce decrypted data. For instance, the public encryption key may be associated with the private encryption key.

In one or more embodiments, the device may obtain the salt data from the decrypted data. For example, the device may utilize the salt data from the decrypted data in determining that the decrypted data is authentic. In one or more embodiments, the device may obtain the hash value from the decrypted data. For example, the device may utilize the hash value from the decrypted data in determining that the application may be trusted. For instance, the device may store one or more hash values, and if the hash value from the decrypted data matches at least one of the one or more hash values stored by the device, the application may be trusted.

Turning now to FIG. 1, an example of an information handling system is illustrated, according to one or more embodiments. An information handling system (IHS) 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS 110 may include or have a form factor of that of or similar to one or more of a laptop, a notebook, a telephone, a tablet, and a PDA, among others. For example, a portable IHS 110 may be readily carried and/or transported by a user (e.g., a person). In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit ($I^2C$) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, a volatile memory medium 150, non-volatile memory media 160 and 170, an I/O subsystem 175, and a network interface 180. As illustrated, volatile memory medium 150, non-volatile memory media 160 and 170, I/O subsystem 175, and network interface 180 may be communicatively coupled to processor 120.

In one or more embodiments, one or more of volatile memory medium 150, non-volatile memory media 160 and 170, I/O subsystem 175, and network interface 180 may be communicatively coupled to processor 120 via one or more buses, one or more switches, and/or one or more root complexes, among others. In one example, one or more of volatile memory medium 150, non-volatile memory media 160 and 170, I/O subsystem 175, and network interface 180 may be communicatively coupled to processor 120 via one or more PCI-Express (PCIe) root complexes. In another example, one or more of an I/O subsystem 175 and a network interface 180 may be communicatively coupled to processor 120 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network.

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing one or more systems, one or more flowcharts, one or more methods, and/or one or more processes described herein. In one example, processor 120 may execute processor instructions from one or more of memory media 150-170 in implementing one or more systems, one or more flowcharts, one or more methods, and/or one or more processes described herein. In another example, processor 120 may execute processor instructions via network interface 180 in implementing one or more systems, one or more flowcharts, one or more methods, and/or one or more processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150-170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or one or more functionalities of and/or compliant with one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150. As shown, non-volatile memory medium 170 may include a private encryption key 173. In one or more embodiments, storing private encryption key 173 via non-volatile memory medium 170 may provide protection or additional protection of private encryption key 173. For example, non-volatile memory medium 170 may not be accessible or may not easily accessible to a person.

As illustrated, a device 185 may be coupled to IHS 110. In one example, device 185 may be or include a peripheral device. In another example, device 185 may be or include a docking station. In one instance, other one or more devices (e.g., one or more of a keyboard, a mouse, a speaker, a storage device, a power supply, etc.) may be coupled to device 185. In a second instance, a network may be coupled to device 185. In another instance, a display may be coupled to device 185. In one or more embodiments, device 185 may be coupled to IHS 110 in a wired fashion. In one or more embodiments, device 185 may be coupled to IHS 110 in a wireless fashion. Although not specifically illustrated, device 185 may be coupled to processor 120, according to one or more embodiments. Although device 185 is illustrated as external to IHS 110, IHS 110 may include device 185, according to one or more embodiments.

In one or more embodiments, processor 120 and one or more components of IHS 110 may be included in a system-on-chip (SoC). For example, the SoC may include processor 120 and a platform controller hub (not specifically illustrated).

Figure 2:
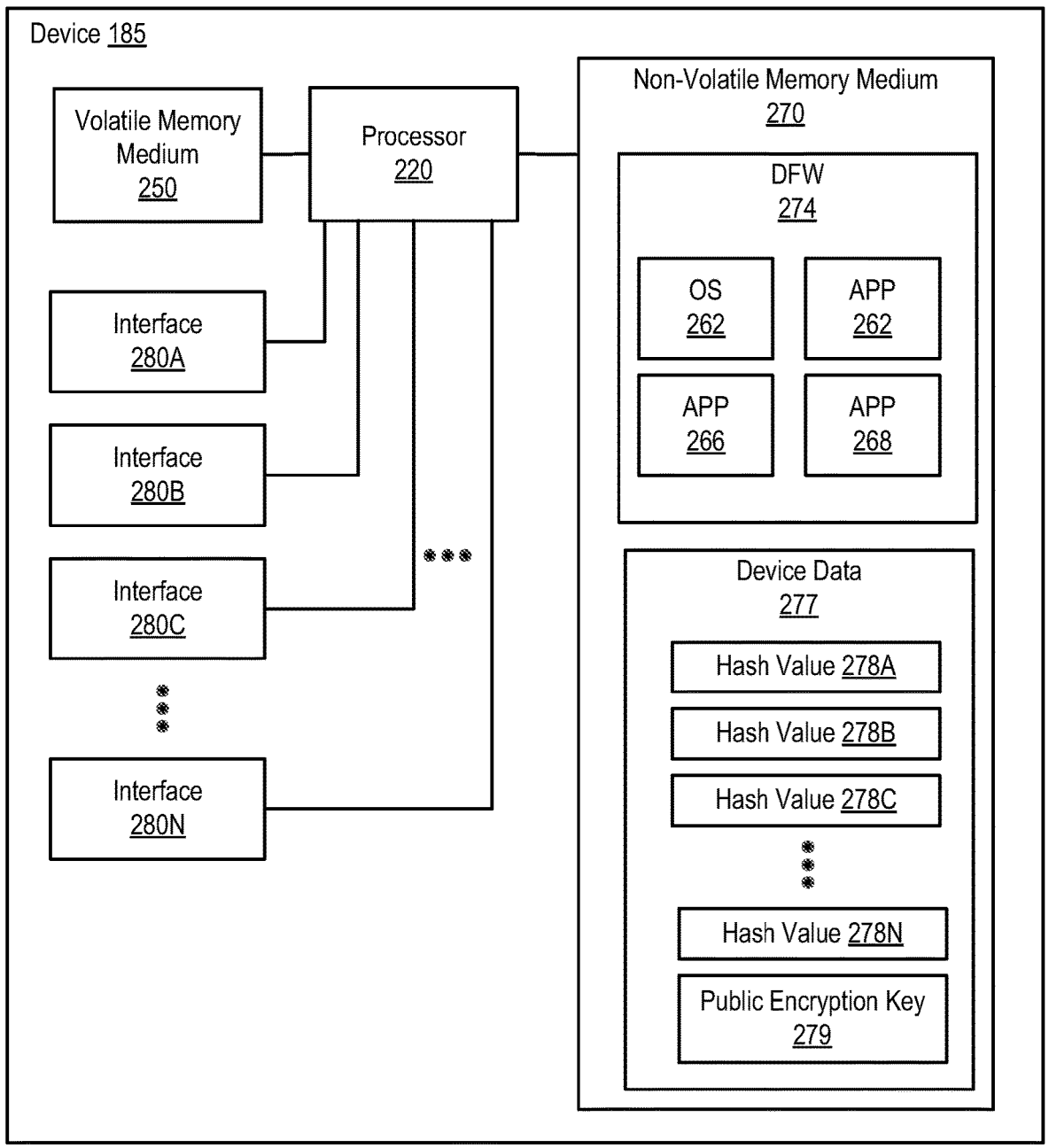
FIG. 2 illustrates an example of a device, according to one or more embodiments.

Turning now to FIG. 2, an example of a device is illustrated, according to one or more embodiments. As shown, device 185 may include a processor 220, a volatile memory medium 250, a non-volatile memory medium 270, and interfaces 280A-280N. As illustrated, processor 220, volatile memory medium 250, non-volatile memory medium 270, and interfaces 280A-280N may be coupled to processor 220. As shown, non-volatile memory medium 270 may include a device firmware (DFW) 274, which may include an OS 262 and APPs 264-268, and may include device data 277. In one example, OS 262 may be or include a real-time operating system (RTOS). In another example, OS 262 may be or include an Unix-like operating system. As illustrated, device data 277 may include hash values 278A-278N. In one or more embodiments, device data 277 may include a data structure that may store hash values 278A-278N. For example, the data structure that may store hash values 278A-278N may be searchable and/or may be utilized to search for a hash value that may match one of hash values 278A-278N. For instance, the data structure may be or include an array, a table, a linked list, and/or a tree, among others.

As shown, device data 277 may include a public encryption key 279. In one or more embodiments, public encryption key 279 may be associated with private encryption key 173. In one example, public encryption key 279 may be utilized to decrypt encrypted data that was encrypted via private encryption key 173. In another example, public encryption key 279 may be utilized to authenticate data that was signed via private encryption key 173.

In one or more embodiments, an interface 280 may include circuitry that enables communicatively coupling to one or more other devices and/or to IHS 110. In one example, interface 280 may include circuitry that enables communicatively coupling to one or more buses. In a second example, interface 280 may include circuitry that enables one or more interrupt signals to be received. In one instance, interface 280 may include general purpose input/output (GPIO) circuitry, and the GPIO circuitry may enable one or more interrupt signals to be received and/or provided via at least one interrupt line. In another instance, interface 280 may include GPIO circuitry that may enable device 185 to provide and/or receive signals associated with other circuitry (e.g., diagnostic circuitry, etc.). In a third example, interface 280 may include circuitry that enables communicatively coupling to one or more networks. For instance, interface 280 may include circuitry that enables communicatively coupling to network interface 180. In a fourth example, interface 280 may include a network interface. In one instance, interface 280 may include circuitry that enables communicatively coupling to a wired network. In another instance, interface 280 may include circuitry that enables communicatively coupling to a wireless network. In a fifth example, interface 280 may include circuitry that enables communicatively coupling to a USB interface. In one instance, interface 280 may include USB device circuitry. In another instance, interface 280 may include USB host circuitry. In a sixth example, interface 280 may include circuitry that enables communicatively coupling to a PCIe interface. In a seventh example, interface 280 may include circuitry that enables communicatively coupling to a SATA interface. In another example, interface 280 may include circuitry that enables communicatively coupling to a display. For instance, interface 280 may include circuitry that enables communicatively coupling via one or more of a digital video interface (DVI), high-definition multimedia interface (HDMI), and a DisplayPort interface, among others.

In one or more embodiments, one or more of OS 262 and APPs 264-268 may include processor instructions executable by processor 220. In one example, processor 220 may execute processor instructions of one or more of OS 262 and APPs 264-268 via non-volatile memory medium 270. In another example, one or more portions of the processor instructions of the one or more of OS 262 and APPs 264-268 may be transferred to volatile memory medium 250, and processor 220 may execute the one or more portions of the processor instructions of the one or more of OS 262 and APPs 264-268 via volatile memory medium 250. In one or more embodiments, processor 220 may execute instructions in accordance with one or more of systems, flowcharts, methods, and/or processes described herein. For example, non-volatile memory medium 270 and/or volatile memory medium 260 may store instructions that may be executable in accordance with at least a portion of one or more of systems, flowcharts, methods, and/or processes described herein. In one or more embodiments, processor 220 may utilize device data 277. In one example, processor 220 may utilize device data 277 via non-volatile memory medium 270. In another example, one or more portions of device data 277 may be transferred to volatile memory medium 250, and processor 220 may utilize device data 277 via volatile memory medium 250.

Figure 3:
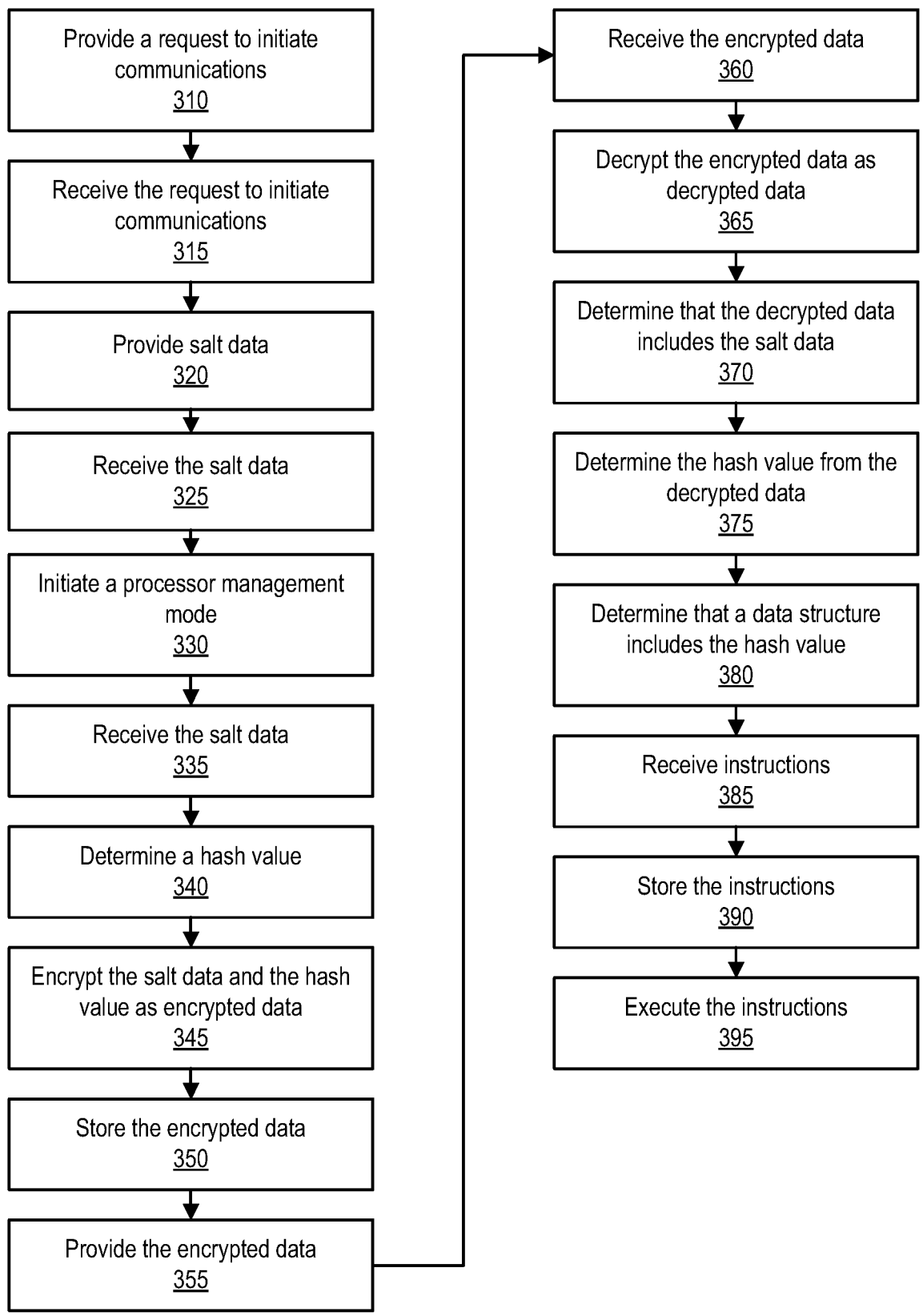
FIG. 3 illustrates an example of a method of communicating with a device, according to one or more embodiments.

Turning now to FIG. 3, an example of a method of communicating with a device is illustrated, according to one or more embodiments. At 310, a request to initiate communications may be provided. For example, APP 164 may provide a request, to device 185, to initiate communications. At 315, the request to initiate communications may be received. For example, device 185 may receive the request to initiate communications from APP 164. At 320, salt data may be provided. For example, device 185 may provide the salt data to APP 164. In one instance, the salt data may include a random number. In a second instance, the salt data may include a pseudo-random number. In another instance, the salt data may include a nonce (e.g., an arbitrary number that may be used once).

At 325, the salt data may be received. For example, APP 164 may receive the salt data from device 185. At 330, a processor management mode may be initiated. For example, APP 164 may initiate the processor management mode. In one instance, APP 164 may initiate the processor management mode via a system management interrupt (SMI). In another instance, APP 164 may initiate the processor management mode via a x86 SMI. In one or more embodiments, a SMI handler may include instructions executable by processor 120. For example, IHSFW 172 may include the SMI handler. In one or more embodiments, processor 120 may execute instructions in an elevated execution privilege state when in the processor management mode. For example, processor 120 may execute instructions a SMI handler in an elevated execution privilege state. At 335, the salt data may be received. For example, the SMI handler may receive the salt data from APP 164. In one or more embodiments, the salt data may be encrypted. For example, device 185 may encrypt the salt data via public encryption key 279. In one or more embodiments, receiving the salt data may include receiving encrypted salt data. For example, IHS 110 may decrypt the encrypted salt data, via private encryption key 173, in receiving and/or obtaining the salt data. For instance, obtaining the salt data via the encrypted salt data may affirm that the salt data was not altered via a "person-in-the-middle" attack.

At 340, a hash value may be determined. For example, a hash value of at least a portion of APP 164 may be determined. In one or more embodiments, the SMI handler may determine a hash value of at least a portion of APP 164. For example, the SMI handler may determine a hash value of one or more portions 410 of APP 164. For instance, the SMI handler may determine a starting marker, may determine an ending marker, and may measure bytes (e.g., instructions, data, etc.) between the starting marker and the ending marker to determine the hash value of at least a portion 410 of APP 164. In one or more embodiments, determining the hash value of the at least the portion of APP 164 may include utilizing a one-way hash function of the at least the portion of APP 164. In one example, a one-way hash function may be relatively easy to compute. For instance, for a value x (e.g., a number, a string, binary data, etc.) and a one-way hash function h, h(x) may be relatively easy to compute. In another example, a one-way hash function may significantly difficult to reverse. For instance, for the one-way hash function h and a value h(z), z may be significantly difficult to compute. In one or more embodiments, significantly difficult to compute may mean that it may take years to compute z from h(z), even if multiple computers were applied to such a task.

In one or more embodiments, a one-way hash function may be considered collision free. For example, the one-way hash function may be injective or one-to-one. For instance, $h(z_1)$ and $h(z_2)$ may produce different values, where $z_1$ and $z_2$ are different. In one or more embodiments, a one-way hash function may be considered a cryptographic checksum, a message digest, a digital fingerprint, a message integrity check, a contraction function, a compression function, and/or a manipulation detection code, among others. Examples of one-way hash functions may include one or more of an Abreast Davies-Meyer, a Davies-Meyer, a message digest (MD) 2, a MD 4, a MD 5, a RIPE-MD, a GOST Hash, a N-HASH, a HAVAL, a SHA (secure hash algorithm) (e.g., SHA-1, SHA-2, SHA-3, etc.), and a SNEFRU, among others. In one or more embodiments, a one-way hash function may be a composite function of two or more one-way hash functions. For example, a function $h_1$ may include a MD 5 one-way hash function $h_2$, a SHA one-way hash function $h_3$, and a MD 5 one-way hash function $h_4$, such that $h_1 = h_2(h_3(h_4(z)))$. For instance, a one-way hash function that is a composite function of two or more one-way hash functions may be considered to be and/or said to be strengthened.

Figure 4A:
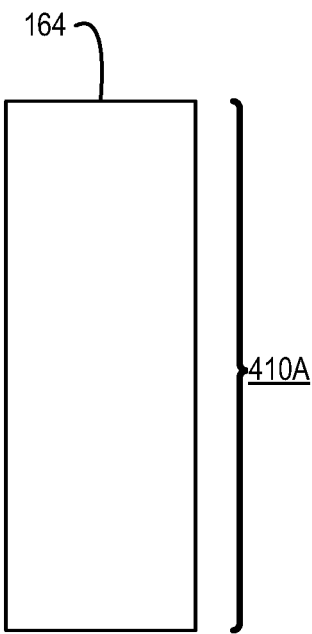
FIGS. 4A-4D illustrate examples of one or more portions of an application, according to one or more embodiments.
Figure 4B:
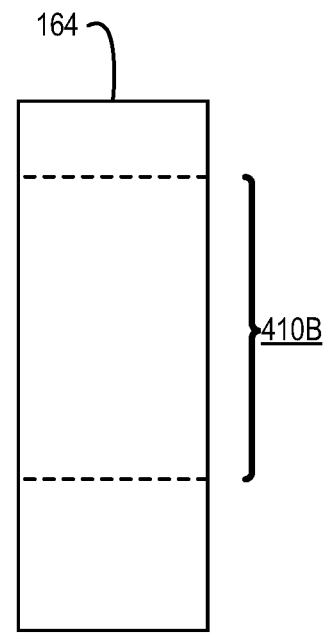
Figure 4C:
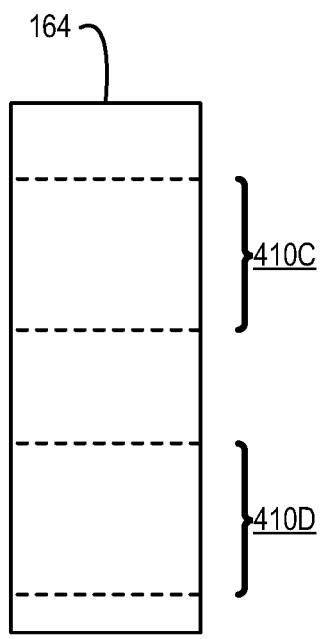
Figure 4D:
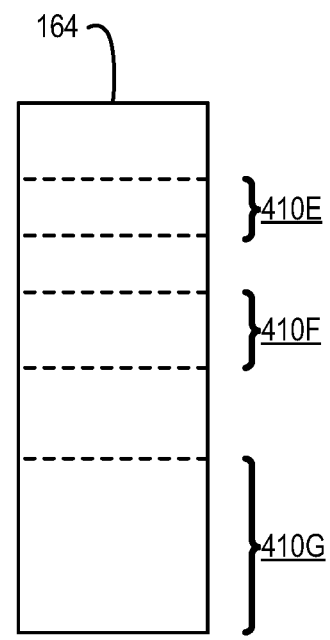

In one or more embodiments, the at least the portion of APP 164 may include an entirety of APP 164. For example, a portion 410A of APP 164 may include an entirety of APP 164, as illustrated in FIG. 4A. In one or more embodiments, the at least the portion of APP 164 may include one or more portions of APP 164. In one example, one or more portions of APP 164 may include a portion 410B, as illustrated in FIG. 4B. In a second example, one or more portions of APP 164 may include portions 410C and 410D, as shown in FIG. 4C. In another example, one or more portions of APP 164 may include portions 410E, 410F, and 410G, as illustrated in FIG. 4D.

Figure 4E:
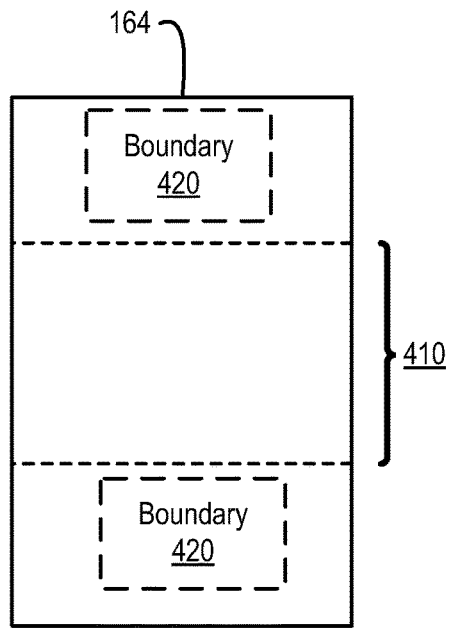
FIG. 4E illustrates an example of a portion of an application between boundaries, according to one or more embodiments.
Figure 4F:
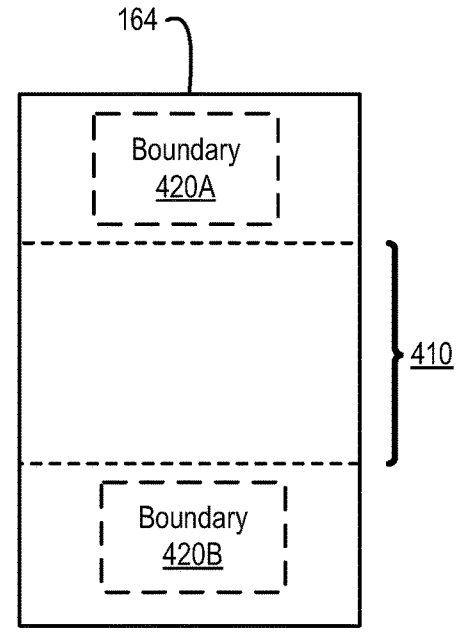
FIG. 4F illustrates an example of a portion of an application between two different boundaries, according to one or more embodiments.
Figure 4G:
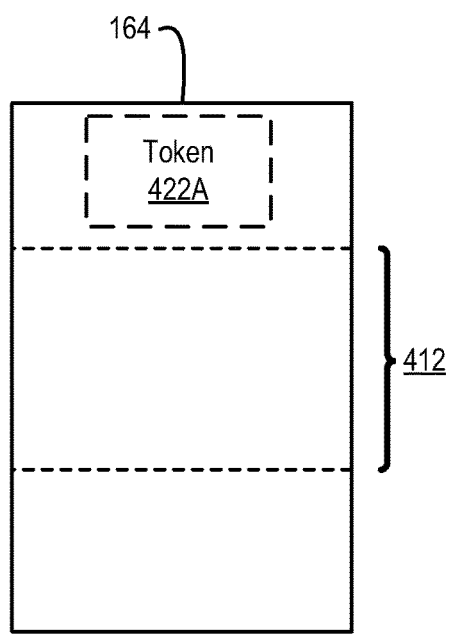
FIGS. 4G-4J illustrate examples of a data area, according to one or more embodiments.
Figure 4H:
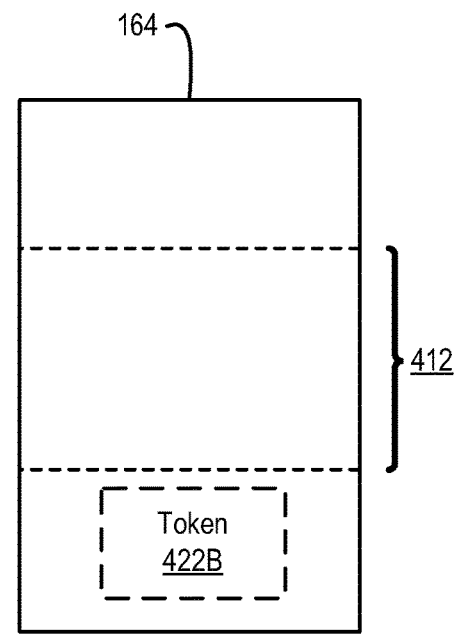

In one or more embodiments, a portion 410 of APP 164 may be bounded. In one example, a portion 410 may be bounded by a boundary 420, as illustrated in FIG. 4E. For instance, a hash value of data and/or instructions between boundary 420 of APP 164 may be determined. In a second example, a portion 410 may be bounded by boundaries 420A and 420B, as shown in FIG. 4F. In one instance, boundary 420A may be different from boundary 420B. In another instance, a hash value of data and/or instructions between boundaries 420A and 420B of APP 164 may be determined. In one or more embodiments, a boundary 420 may be or include an identifier. For example, the identifier may be or include a marker. For instance, the identifier may be associated with low probability of a collision with data and/or instructions of APP 164. In one or more embodiments, the identifier may be or include one or more of a globally unique identifier (GUID), an universally unique identifier (UUID), and a hash value, among others.

In one or more embodiments, a first position of APP 164 may be determined. In one example, the first position of APP 164 may be or include boundary 420. For instance, the first position of APP 164 may be or include a first instance or occurrence of boundary 420. In a second example, the first position of APP 164 may be or include an address of boundary 420. In a third example, the first position of APP 164 may be or include an address subsequent to boundary 420. For instance, the address subsequent to boundary 420 may be immediately subsequent to boundary 420. In a fourth example, the first position of APP 164 may be or include an address previous to boundary 420. For instance, the address previous to boundary 420 may be immediately previous to boundary 420. In a fifth example, the first position of APP 164 may be or include boundary 420A. In a sixth example, the first position of APP 164 may be or include an address of boundary 420A. In a seventh example, the first position of APP 164 may be or include an address subsequent to boundary 420A. For instance, the address subsequent to boundary 420A may be immediately subsequent to boundary 420A. In another example, the first position of APP 164 may be or include an address previous to boundary 420A. For instance, the address previous to boundary 420A may be immediately previous to boundary 420A.

In one or more embodiments, determining the first position of APP 164 may include starting at a first memory address. For example, the determining the first position of APP 164 may include searching for the first position of APP 164 starting at the first memory address. In one or more embodiments, the SMI handler may utilize an address that generated the SMI from an instruction pointer register. For example, the instruction pointer register may be or include an extended instruction pointer (EIP) register. For instance, utilizing the EIP register may affirm that one or more methods, one or more process, and/or one or more systems described herein may not be circumvented. In one or more embodiments, an address stored by the instruction pointer register may be utilized as the first memory address, where the SMI handler may start searching for the first position of APP 164. In one or more embodiments, an application boundary may be one address lower from an address that generated the SMI. In one or more embodiments, an application boundary may be one address higher from an address that generated the SMI. In one or more embodiments, these may establish a starting marker and/or an ending marker.

In one or more embodiments, a second position of APP 164 may be determined. In one example, the second position of APP 164 may be or include boundary 420. For instance, the second position of APP 164 may be or include a second instance or occurrence boundary 420. In a second example, the second position of APP 164 may be or include an address of boundary 420. In a third example, the second position of APP 164 may be or include an address subsequent to boundary 420. For instance, the address subsequent to boundary 420 may be immediately subsequent to boundary 420. In a fourth example, the second position of APP 164 may be or include an address previous to boundary 420. For instance, the address previous to boundary 420 may be immediately previous to boundary 420. In a fifth example, the second position of APP 164 may be or include boundary 420B. In a sixth example, the second position of APP 164 may be or include an address of boundary 420B. In a seventh example, the second position of APP 164 may be or include an address subsequent to boundary 420B. For instance, the address subsequent to boundary 420B may be immediately subsequent to boundary 420B. In another example, the second position of APP 164 may be or include an address previous to boundary 420B. For instance, the address previous to boundary 420B may be immediately previous to boundary 420B. In one or more embodiments, one or more boundaries 420 may be utilized in establishing one or more regions to be measured for an integrity check. For example, one or more boundaries 420 may be utilized in establishing one or more regions to be utilized in determining a hash value.

At 345, the salt data and the hash value may be encrypted as encrypted data. For example, the SMI handler may encrypt the salt data and the hash value as encrypted data. For instance, the SMI handler may utilize private encryption key 173 to encrypt the salt data and the hash value as encrypted data. In one or more embodiments, encrypting the salt data and the hash value may include utilizing an elliptic curve cryptographic process to encrypt the salt data and the hash value as the encrypted data. In one or more embodiments, the salt data and the hash value may be concatenated. For example, a concatenation of the salt data and the hash value may be encrypted as the encrypted data.

Figure 4I:
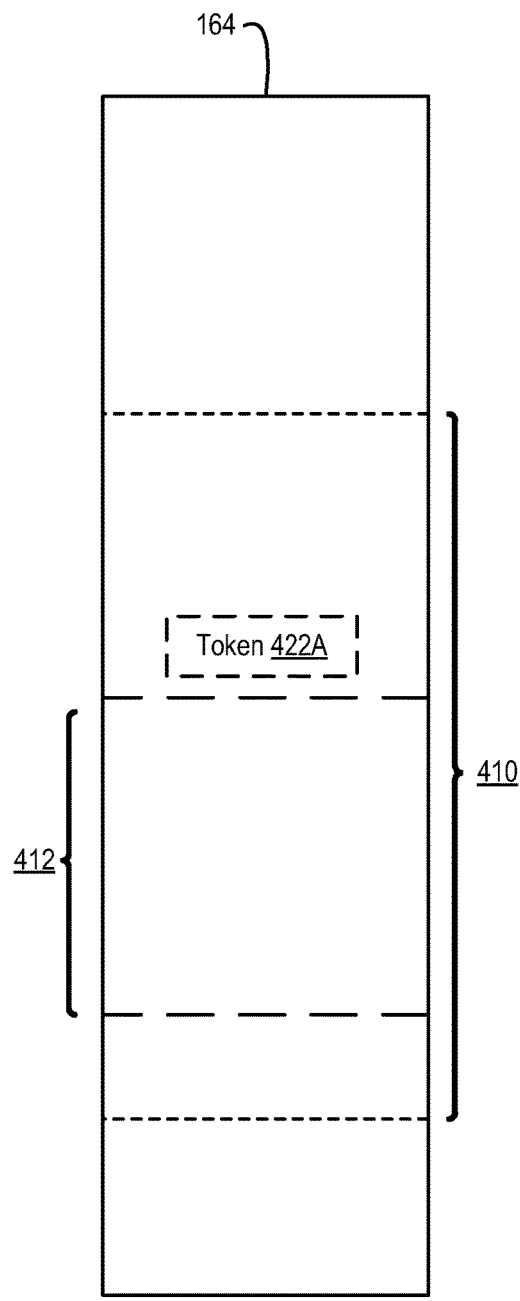
Figure 4J:
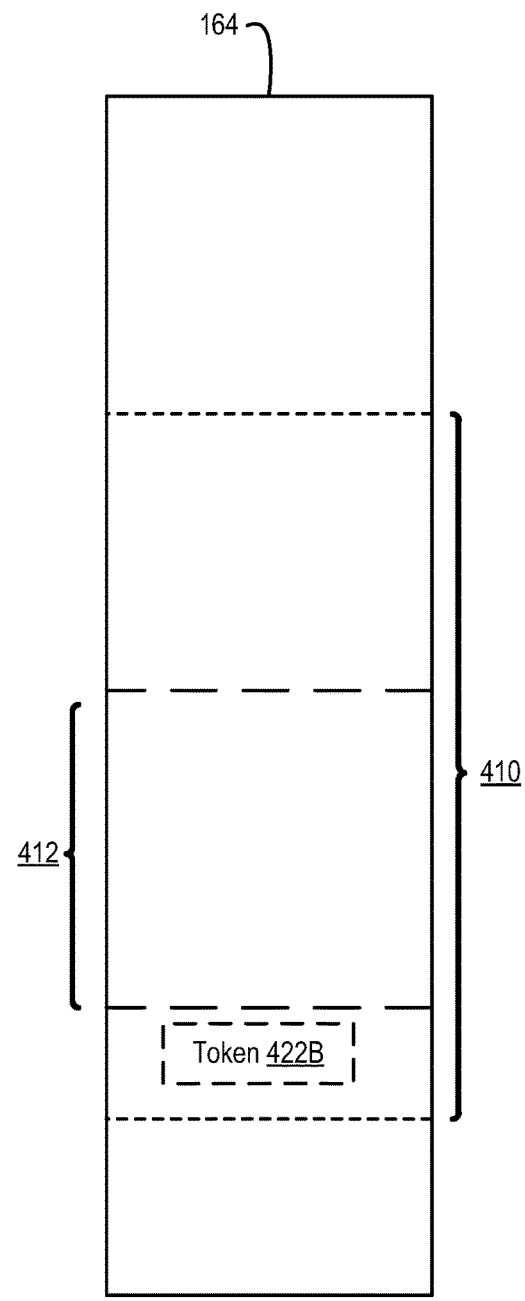

At 350, the encrypted data may be stored. For example, the SMI handler may store the encrypted data. In one or more embodiments, the SMI handler may store the encrypted data via buffer associated with APP 164. For example, APP 164 may pass, to the SMI handler, a pointer to the buffer associated with APP 164. In one or more embodiments, the SMI handler may store the encrypted data via a data area of APP 164. For example, APP 164 may include the data area of APP 164. For instance, APP 164 may pass, to the SMI hander, a pointer to the data area of APP 164. In one or more embodiments, the encrypted data may be stored via a data area 412, illustrated in FIGS. 4G-4J. For example, a token 422 may be associated with data area 412. In one instance, a token 422A may be or include a pointer associated with data area 412. In a second instance, a token 422B may be or include a pointer associated with data area 412. In another instance, a token 422 may be or include a pointer to data area 412 within a portion 410 of APP 164. In one or more embodiments, data area 412 may be or include a buffer. For example, the buffer may be located within a portion 410 of APP 164. As illustrated in FIGS. 4G-4J, tokens 422A and 422B may be at a beginning or an ending of data area 412. In one example, data area 412 may immediately follow token 422A. In another example, data area 412 may immediately precede token 422B. As shown in FIGS. 4I and 4J, a token 422 may be located within a portion 410 of APP 164.

In one or more embodiments, a token 422 may be or include an identifier. For example, the identifier may be or include a marker. For instance, the identifier may be associated with low probability of a collision with data and/or instructions of APP 164. In one or more embodiments, the identifier may be or include one or more of a GUID, an UUID, and a hash value, among others. In one or more embodiments, the SMI handler may scan and/or search for a token 422. For example, the SMI handler may scan and/or search for a token 422 to determine data area 412. In one or more embodiments, a portion 410 may include data area 412 and/or token 422. For example, scanning and/or searching for a token 422 may start at a beginning or an ending of portion 410. For instance, scanning and/or searching for a token 422 may start at a boundary 420.

At 355, the encrypted data may be provided. For example, APP 164 may provide the encrypted data to device 185. At 360, the encrypted data may be received. For example, device 185 may receive the encrypted data. At 365, the encrypted data may be decrypted as decrypted data. For example, device 185 may decrypt the encrypted data as the decrypted data. For instance, device 185 may utilize public encryption key 279 to decrypt the encrypted data as the decrypted data. At 370, it may be determined that the decrypted data includes the salt data. For example, device 185 may determine that the decrypted data includes the salt data. In one or more embodiments, data area may be or include a data structure. For example, information may be exchanged via data area 412. In one instance, APP 164 may exchange information with the SMI handler. In another instance, the SMI handler may exchange information with APP 164.

At 375, it may be determined that the decrypted data includes the hash value. For example, device 185 may determine that the decrypted data includes the hash value. At 380, it may be determined that a data structure includes the hash value. For example, device 185 may determine that the data structure includes the hash value. In one or more embodiments, determining that the data structure includes the hash value may include searching device data 277 for the hash value. For example, determining that the data structure includes the hash value may include matching the hash value to a hash value of hash values 278A-278N.

In one or more embodiments, after device 185 determines that the data structure includes the hash value, device 185 may receive instructions from APP 164. For example, after device 185 determines that the data structure includes the hash value, device 185 may trust instructions received from APP 164. For instance, after device 185 determines that the data structure includes the hash value, instructions received from APP 164 may be considered approved instructions. In one or more embodiments, if device 185 does not determine that the data structure includes the hash value, device 185 may not utilize instructions from APP 164. In one example, if device 185 does not determine that the data structure includes the hash value, device 185 may receive instructions from APP 164 but may not utilize the instructions from APP 164. For instance, if device 185 does not determine that the data structure includes the hash value, device 185 may disregard the instructions from APP 164. In another example, if device 185 does not determine that the data structure includes the hash value, device 185 may block receiving instructions from APP 164.

At 385, instructions may be received. For example, device 185 may receive instructions from APP 164. In one instance, the instructions from APP 164 may be or include firmware for device 185. In a second instance, the instructions from APP 164 may be or include an application for device 185. In another instance, the instructions from APP 164 may be or include a new hash value for one of hash values 278A-278N or a new, additional, hash value. At 390, the instructions may be stored. For example, device 185 may store the instructions. For instance, device 185 may store the instructions via non-volatile memory medium 270. At 395, the instructions may be executed. For example, device 185 may execute the instructions.

Figure 5:
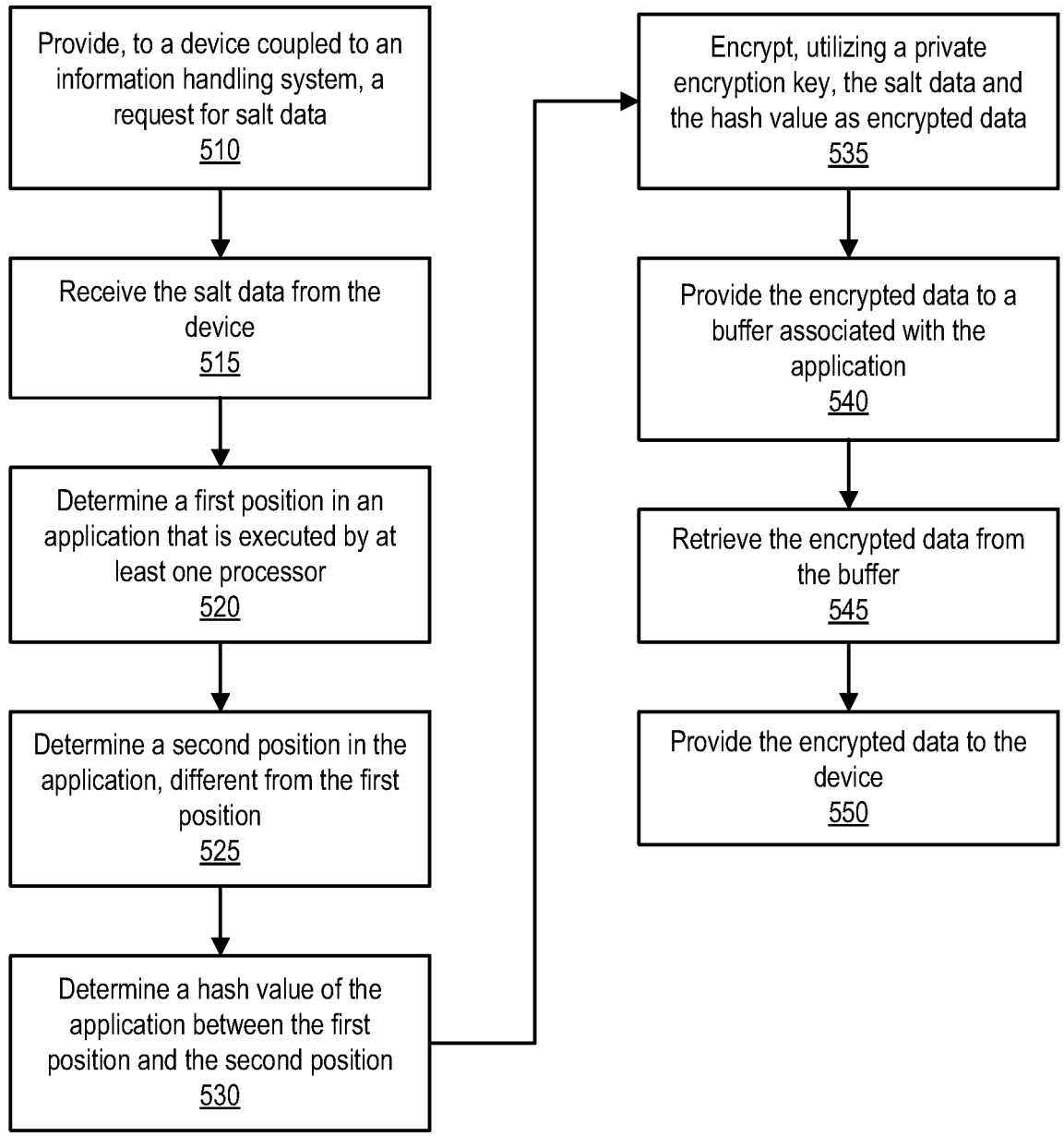
FIG. 5 illustrates an example of a method of operating an information handling system, according to one or more embodiments.

Turning now to FIG. 5, an example of a method of operating an information handling system is illustrated, according to one or more embodiments. At 510, a request for salt data may be provided to a device. For example, IHS 110 may provide, to device 185, a request for salt data. At 515, the salt data may be received from the device. For example, IHS 110 may receive the salt data from device 185. In one or more embodiments, the salt data may be encrypted via an encryption key. For example, the salt data may be encrypted via public encryption key 279. For instance, receiving the salt data from device 185 may include IHS 110 decrypting, via private encryption key 173, encrypted data to obtain the salt data.

At 520, a first position in an application that is executed by at least one processor may be determined. For example, IHS 110 may determine a first position in an application that is executed by at least one processor of IHS 110. In one instance, the at least one processor of IHS 110 may include processor 120. In another instance, the application may be or include APP 164. In one or more embodiments, the first position of APP 164 may be or include boundary 420. In one example, the first position of APP 164 may be or include a first instance or occurrence of boundary 420. In another example, the first position of APP 164 may be or include boundary 420A. In one or more embodiments, determining a first position in an application that is executed by at least one processor may include searching for a marker within the application. For example, the marker may be or include at least one of a UUID and a GUID, among others. In one or more embodiments, searching for the marker within the application may include searching for the marker within the application starting at an address of an instruction pointer of the at least one processor. For example the instruction pointer may be or include an EIP register of the at least one processor. For instance, the EIP register may store an address of a memory medium of IHS 110 that may be utilized as a starting point for a search for the first position in the application.

At 525, a second position in the application, different from the first position, may be determined. For example, IHS 110 may determine a second position in the application, different from the first position. In one instance, the second position in the application may be or include a second instance or occurrence of boundary 420. In another instance, the second position in the application may be or include boundary 420B.

At 530, a hash value of the application between the first position and the second position may be determined. For example, IHS 110 may determine a hash value of the application between the first position and the second position. In one or more embodiments, the hash value of the application between the first position and the second position may be determined via a one-way hash function. In one or more embodiments, determining a hash value of the application between the first position and the second position may include determining a hash value of at least a portion of APP 164. For example, a hash value of application portion 410 may be determined. In one or more embodiments, determining a hash value of the application between the first position and the second position may include utilizing at least one of an Abreast Davies-Meyer, a Davies-Meyer, a MD2, a MD4, a MD5, a RIPE-MD, a GOST Hash, a N-HASH, a HAVAL, a SHA, and a SNEFRU, among others.

At 535, the salt data and the hash value may be encrypted, utilizing a private encryption key, as encrypted data. For example, IHS 110 may encrypt, utilizing a private encryption key, the salt data and the hash value as encrypted data. For instance, the private encryption key may be or include private encryption key 173. In one or more embodiments, the salt data and the hash value may be combined. For example, the salt data and the hash value may be concatenated. For instance, a concatenation of the salt data and the hash value may be encrypted, utilizing the private encryption key, as the encrypted data. In one or more embodiments, encrypting the salt data and the hash value may include utilizing an elliptic curve cryptographic process to encrypt the salt data and the hash value as the encrypted data. In one or more embodiments, signing the hash value may include encrypting, utilizing a private encryption key, a combination of the salt data and the hash value.

At 540, the encrypted data may be provided to a buffer associated with the application. For example, IHS 110 may provide the encrypted data to a buffer associated with APP 164. In one instance, the buffer may be external to APP 164. In another instance, APP 164 may include the buffer. In one or more embodiments, the encrypted data may be provided to data area 412. For example, IHS 110 may provide the encrypted data to data area 412. At 545, the encrypted data may be retrieved from the buffer. For example, IHS 110 may retrieve the encrypted data from the buffer. For instance, APP 164 may retrieve the encrypted data from the buffer.

In one or more embodiments, the encrypted data may be retrieved from data area 412. For example, IHS 110 may retrieve the encrypted data from data area 412. For instance, APP 164 may retrieve the encrypted data from data area 412. At 550, the encrypted data may be provided to the device. For example, IHS 110 may provide the encrypted data to the device. For instance, APP 164 may provide the encrypted data to the device. In one or more embodiments, the encrypted data provided to the device may be for verifying that APP 164 may be trusted.

In one or more embodiments, method elements 510-540 may be performed by an interrupt handler. For example, the interrupt handler may execute instruction at an elevated execution privilege state of processor 120, than an application would execute instructions. For instance, the interrupt handler may be a SMI handler, which may execute instructions at an elevated execution privilege state of processor 120 compared to APP 164. In one or more embodiments, method elements 545 and 550 may be performed by an application. For example, the method elements 545 and 550 may be performed by APP 164.

Figure 6:
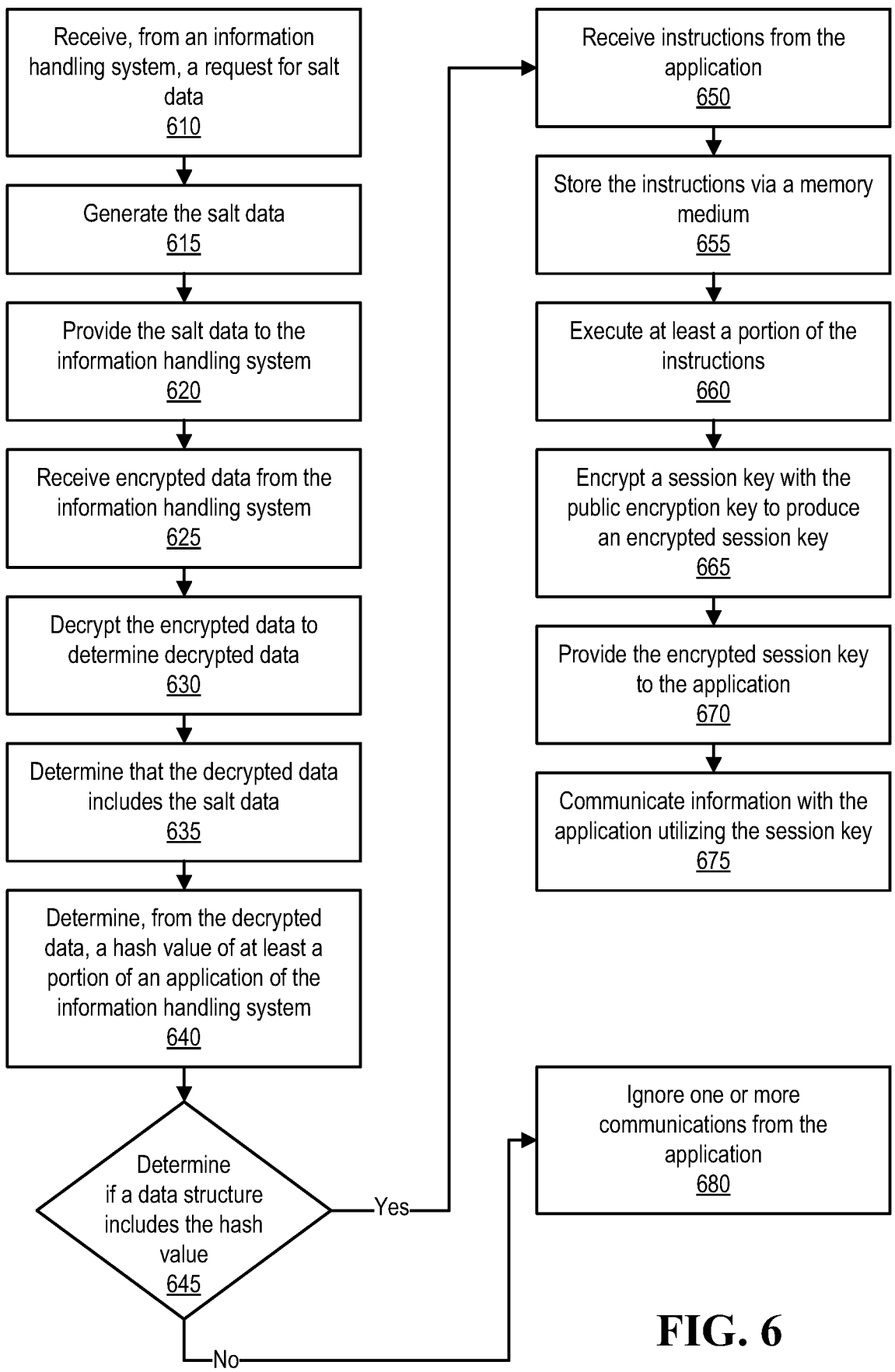
FIG. 6 illustrates an example of a method of operating a device, according to one or more embodiments.

Turning now to FIG. 6, an example of a method of operating a device is illustrated, according to one or more embodiments. At 610, a request for salt data may be received from an information handling system. For example, device 185 may receive a request for salt data from IHS 110. At 615, the salt data may be generated. For example, device 185 may generate the salt data. In one instance, the salt data may include a random number. In a second instance, the salt data may include a pseudo-random number. In another instance, the salt data may include a nonce (e.g., an arbitrary number that may be used once). In one or more embodiments, generating the salt data may be performed in response to receiving the request for the salt data from the information handling system.

At 620, the salt data may be provided to the information handling system. For example, device 185 may provide the salt data to IHS 110. In one or more embodiments, providing the salt data to the information handling system may include providing encrypted salt data to the information handling system. For example, device 185 may encrypt the salt data via public encryption key 279 to produce and/or provide the encrypted salt data. For instance, IHS 110 may decrypt the encrypted salt data, via private encryption key 173, to obtain the salt data.

At 625, encrypted data may be received from the information handling system. For example, device 185 may receive encrypted data from IHS 110. At 630, the encrypted data may be decrypted to determine decrypted data. For example, device 185 may decrypt the encrypted data to determine decrypted data. In one or more embodiments, decrypting the encrypted data to determine decrypted data may include utilizing a public key to decrypt the encrypted data to determine the decrypted data. For example, device 185 may utilize public encryption key 279 to decrypt the encrypted data to determine the decrypted data. For instance, public encryption key 279 may be associated with private encryption key 173, which may have been utilized to produce the encrypted data.

At 635, it may be determined that the decrypted data includes the salt data. For example, device 185 may determine that the decrypted data includes the salt data. In one or more embodiments, determining that the decrypted data includes the salt data may authenticate the decrypted data. In one or more embodiments, verifying a signature of a hash value may include determining that the decrypted data includes the salt data. For example, if a signature of a hash value the hash value may be considered authenticated. At 640, a hash value of at least a portion of an application of the information handling system may be determined from the decrypted data. For example, device 185 may determine, from the decrypted data, a hash value of at least a portion of APP 164 of IHS 110. In one or more embodiments, determining, from the decrypted data, a hash value of at least a portion of an application of the information handling system may be performed in response to determining that the decrypted data includes the salt data.

At 645, it may be determined if a data structure includes the hash value. For example, device 185 may determine if a data structure includes the hash value. In one or more embodiments, device 185 may store a data structure that includes hash values. For example, the data structure may include hash values 278A-278N. For instance, the data structure may be searchable. In one or more embodiments, the data structure may include an array, a table, a linked list, and/or a tree, among others. In one or more embodiments, determining that the data structure includes the hash value may include comparing the hash value with one or more of hash values 278A-278N until the hash value is matched to one of hash values 278A-278N. For example, hash values 278A-278N may be hash values associated with respective applications that are approved to interact with one or more portions of device 185. For instance, the one or more portions of device 185 may be or include one or more restricted and/or authorized portions of device 185. In one or more embodiments, if the hash value is not included in hash values 278A-278N, APP 164 may not be authorized to interact with the one or more restricted and/or authorized portions of device 185.

If the data structure includes the hash value, instructions from the application may be received, at 650. For example, device 185 may receive instructions from APP 164. In one instance, the instructions from the application may be or include firmware for device 185. In a second instance, the instructions from the application may be or include an application for device 185. In another instance, the instructions from the application may be or include a new hash value for one of hash values 278A-278N or a new, additional, hash value. In one or more embodiments, receiving instructions from the application may be performed in response to determining that the data structure includes the hash value.

At 655, the instructions may be stored via a memory medium. For example, device 185 may store the instructions via a memory medium. In one instance, device 185 may store the instructions via volatile memory medium 250. In another instance, device 185 may store the instructions via non-volatile memory medium 270. In one or more embodiments, storing the instructions via a memory medium may be performed in response to determining that the data structure includes the hash value. In one or more embodiments, storing the instructions via a memory medium may be performed in response to receiving the instructions from the application.

At 660, at least a portion of the instructions may be executed. For example, device 185 may execute at least a portion of the instructions. At 665, a session key may be encrypted with the public encryption key to produce an encrypted session key. For example, device 185 may encrypt a session key with the public encryption key to produce an encrypted session key. For instance, the session key may be utilized in communications with the application (e.g., APP 164). At 670, the encrypted session key may be provided to the application. For example, device 185 may provide the encrypted session key to APP 164. At 675, information may be communicated with the application utilizing the session key. For example, device 185 may communicate information with APP 164 utilizing the session key.

If the data structure does not include the hash value, one or more communications from the application may be ignored, at 680. For example, device 185 may ignore one or more communications from APP 164. For instance, APP 164 may not be authorized to interact with the one or more restricted and/or authorized portions of device 185.

Figure 7:
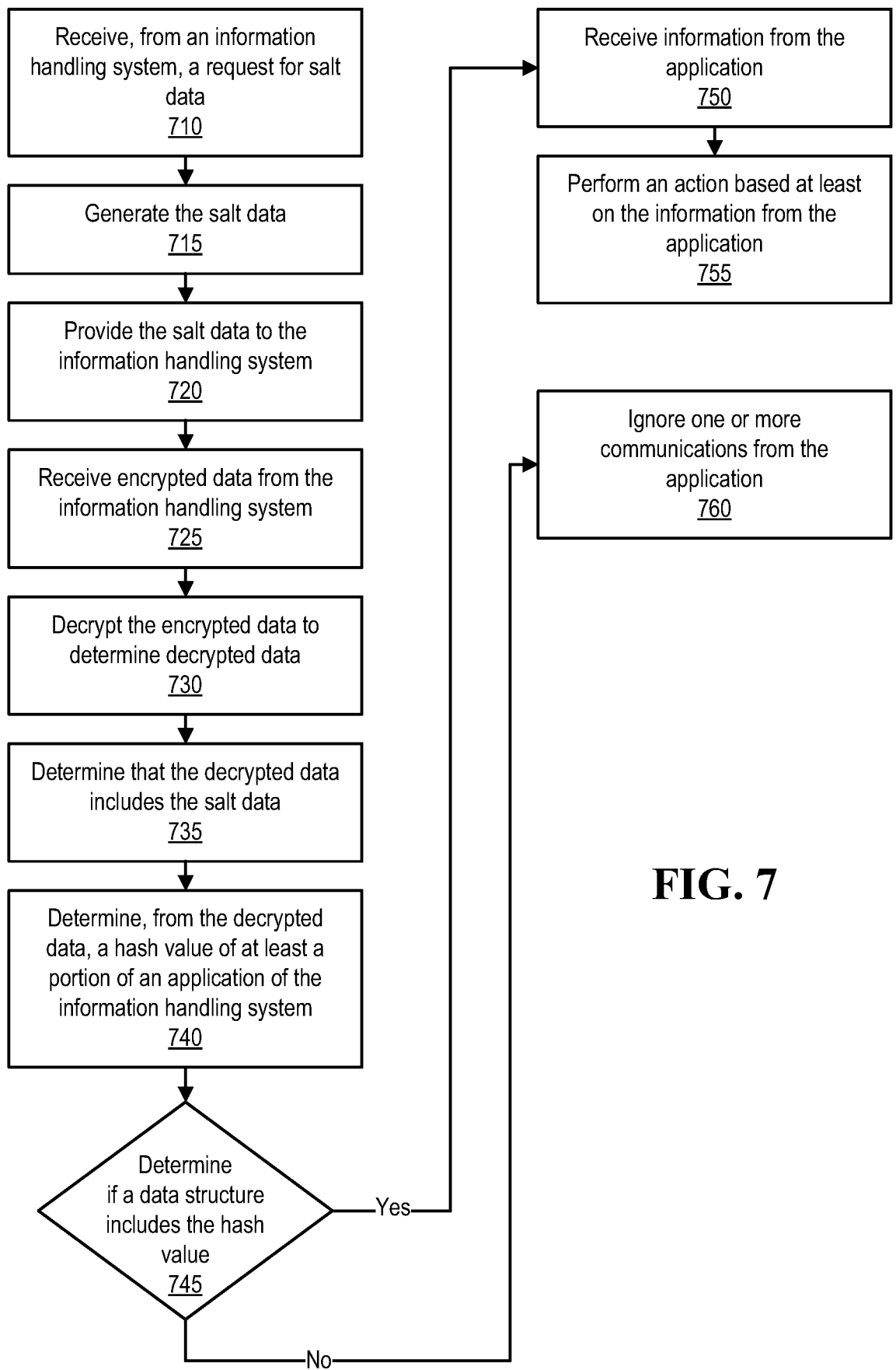
FIG. 7 illustrates an example of another method of operating a device, according to one or more embodiments.

Turning now to FIG. 7, an example of another method of operating a device is illustrated, according to one or more embodiments. In one or more embodiments, method elements 710-745 may be performed in accordance with method elements 610-645, respectively. If the data structure includes the hash value (determined at 745), information may be received from the application, at 750. For example, device 185 may receive information from APP 164. For instance, the information from APP 164 may be or include one or more commands.

At 755, an action may be performed based at least on the information from the application. In one or more embodiments, the action may be associated with a previously blocked command. For example, the command may have been previously blocked until it is determined that the data structure includes the hash value. In one or more embodiments, device 185 may perform an action based at least on the information from APP 164. In one example, the action may include unlocking and/or enabling a feature of device 185. For instance, the feature may be or include a licensed feature of device 185. In a second example, the action may include erasing at least a portion of a memory medium of device 185. For instance, the action may include erasing at least a portion of non-volatile memory medium 270. In a third example, the action may include writing to at least a portion of a memory medium of device 185. For instance, the action may include writing to at least a portion of non-volatile memory medium 270. In a fourth example, the action may include enabling a data storage of device 185. In a fifth example, the action may include permitting access to a data storage of device 185. In another example, the action may include permitting greater communication bandwidth in communicating with device 185.

If the data structure does not include the hash value (determined at 745), one or more communications from the application may be ignored, at 760. For example, device 185 may ignore one or more communications from APP 164. In one instance, APP 164 may not be authorized to interact with the one or more restricted and/or authorized portions of device 185. In another instance, device 185 may ignore one or more commands from APP 164.

In one or more embodiments, one or more of the method and/or process elements and/or one or more portions of a method and/or processor elements may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with one or more flowcharts, one or more systems, one or more methods, and/or one or more processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system, comprising:
 a processor; and
 a memory, coupled to the processor, that stores an application and a set of instructions executable by the processor, which when executed by the processor, cause the information handling system to:
 send, to a device coupled to the information handling system, a request to initiate communication between the information handling system and the device;
 receive an encrypted first response from the device, wherein the encrypted first response comprises salt data;
 decrypt the encrypted first response received from the device;

store the salt data in the memory in the information handling system;
initiate a processor management triode via a system management interrupt (SMI),
wherein a SMI handler comprises a set of SW instructions executable by the information handling system processor to:
retrieve the salt data from the memory;
identify an information handling system application;
determine a hash value of at least a portion of the information handling system application;
combine the salt data with the hash value for at least a portion of an information handling system application executing on the information handling system;
encrypt, utilizing a private encryption key, the salt data and the hash value as encrypted data; and
store the encrypted data in a buffer associated with the information handling system application, wherein:
the information handling system application is configured to:
retrieve the encrypted data from the buffer; and
send the encrypted data to the device with a set of instructions to utilize the device; and
the device is configured to:
decrypt the encrypted data to determine decrypted data;
determine that the decrypted data includes the salt data received from the information handling system;
determine that the salt data received from the information handling system matches the stored salt data;
determine that the decrypted data comprises a hash value, and
determine that the hash value matches a hash value of a set of hash values, wherein
if the hash value received from the information handling system matches a hash value of the set of hash values, execute one or more instructions of the set of device instructions to perform one or more of:
store, in the memory, information indicating, the information handling system application is a trusted application; and
perform one or more actions in response to receiving a set of instructions from the information handling system application; and
if the hash value received from the information handling system does not match a hash value of the set of hash values, execute one or more instructions of the set of device instructions to perform one or more of ignoring one or more communications received from the information handling system application, blocking a command received from the information handling system application, and limiting access for the information handling system application to one or more portions of the device.

2. The information handling system of claim 1, wherein the set of instructions are executable by the processor to utilize an elliptic curve cryptographic process to encrypt the salt data and the hash value as the encrypted data.

3. The information handling system of claim 1, wherein the set of instructions are executable by the processor to store one or more of a pointer to the buffer associated with the information handling system application, a pointer to a data area associated with the information handling system application, a token associated with the data area associated with the information handling system application, a position of the information handling system application and an identifier of the data area associated with the information handling system application.

4. The information handling system of claim 3, wherein, to determine the position of the information handling system application, the set of instructions are executable by the processor to search for a marker within the data area associated with the information handling system application.

5. The information handling system of claim 4, wherein the marker includes at least one of a universally unique identifier (UUID) and a globally unique identifier (GUID).

6. The information handling system of claim 4, wherein, to search for the marker within the data area associated with the information handling system application, the set of instructions are executable by the processor to search for the marker within the data area associated with the information handling system application starting at an address of an instruction pointer of the processor.

7. A method, comprising:
sending, from an information handling system to a device communicatively coupled to the information handling system, a request to initiate communication;
sending, by the device in response to receiving the request, an encrypted response comprising salt data;
receiving, by the information handling system, the encrypted response;
decrypting the response received from the device;
storing the salt data in a memory in the information handling system;
initiating, by the information handling system, a processor management mode via a system management interrupt (SMI);
executing, by the information handling system, a SMI handler comprising a set of SMI instructions executable by the information handling system, wherein executing the SMI handler comprises:
retrieving the salt data from the memory;
combining the salt data with a hash value calculated for at least a portion of an information handling system application executing on the information handling system;
encrypting the combined salt data and the hash value into encrypted data; and
storing the encrypted data in a buffer associated with the information handling system application;
communicating, by the information handling system, the encrypted data to the device;
receiving, by the device, the encrypted data;
decrypting the encrypted data to determine decrypted data;
determining that the decrypted data includes salt data received from the information handling system;
determining that the salt data received from the information handling system matches the stored salt data;
determining that the decrypted data comprises a hash value; and
determining that the hash value matches a hash value of a set of hash values, wherein
if the hash value received from the information handling system matches a hash value of the set of hash values, executing, by the device, one or more instructions of the set of device instructions to perform one or more of:
storing, in a memory associated with the device, information indicating the information handling system application is a trusted application; and
performing one or more actions in response to receiving a set of instructions from the information handling system application; and
if the hash value received from the information handling system does not match a hash value of the set of hash values, executing, by the device, one or more instructions of the set of device instructions to perform one or more of ignoring one or more communications received from the information handling system application, blocking a command received from the information handling system application, and limiting access for the information handling system application to one or more portions of the device.

8. The method of claim 7, wherein:
the device comprises a docking station; and
the one or more portions of the device comprise circuitry for communicatively coupling the device to a network, a USB interface, a high-definition multimedia interface (HDMI), a peripheral component interconnect express (PCIe) interface, a display and a serial advanced technology attachment (SATA) interface.

9. The method of claim 7, wherein if the hash value from the decrypted data matches a hash value of at least a portion of the information handling system application, executing, by the device one or more device instructions of the set of device instructions to perform one or more of executing a previously blocked command, unlocking a feature of the device, erasing a portion of a non-volatile memory of the device, enabling access to a data storage of the device, providing greater communication bandwidth and adding a new hash value.

10. The method of claim 7, wherein the salt data includes at least one of a random number and a pseudo-random number.

11. The method of claim 7, wherein the information handling system comprises:
a memory storing the information handling system application and a set of information handling system instructions; and
an information handling system processor executing the set of information handling system instructions to perform:
determining a first position of the information handling system application in the memory;
determining a second position of the information handling system application in the memory, different from the first position; and
calculating the hash value for the at least a portion of the information handling system application.

12. The method of claim 11, further comprising:
encrypting a session key with a public encryption key to produce an encrypted session key; and
providing the encrypted session key to the information handling system application.

13. The method of claim 12, further comprising:
communicating, utilizing the session key, information with the information handling system application.

14. A system, comprising: an information handling system comprising:
an information handling system processor
an information handling system memory storing a set of information handling system instructions executable by the information handling system processor to execute an information handling system application of a plurality of information handling system applications and a private encryption key; and
a device communicatively coupled to the information handling system the device comprising:
a device processor; and
a device memory storing a public encryption key, a set of hash values and a set of device instruction executable by the device processor to execute a device application of a plurality of device applications, wherein:
the information handling system processor is configured to send a request to the device processor to initiate communication;
the device processor is configured to send, in response to receiving the request, an encrypted response comprising salt data generated by the device;
the information handling system processor is configured to receive the encrypted response, decrypt the response and store the salt data; the information handling system processor is configured to initiate a processor management mode via a system management interrupt (SMI), wherein a SMI handler comprising a set of SMI instructions executable by the information handling system processor to retrieve the salt data, combine the salt data with a hash value associated with at least a portion of an information handling system application, encrypt the combined salt data and the hash value into encrypted data and communicate the encrypted data to the device processor;
the device processor is configured to receive the encrypted data from the information handling system;
the device processor is configured to decrypt, using a public key stored in a non-volatile memory, the encrypted data to determine decrypted data;
the device processor is configured to:
determine that the decrypted data received from the information handling system includes salt data that matches the salt data generated by the device;
determine that the decrypted data comprises a hash value; and compare the hash value from the decrypted data with the hash value associated with at least a portion of the information handling system application, wherein:
if the hash value from the decrypted data matches the hash value associated with the at least a portion of the information handling system application:
in response to receiving a second set of instructions from the information handling system application executing the second set of instructions received from the information handling system application; and
if the hash value from the decrypted data does not match a hash value of at least a portion of the information handling system application, the device processor is configured to execute one or more instructions of the set of device instructions to perform one or more of ignoring one or move communications received from the information handling system application, blocking a command received from the information handling system application, and limiting access by the information handling system application to one or more portions of the device.

15. The system of claim 14, wherein:
the device comprises a docking station; and
the one or more portions of the device comprise circuitry for communicatively coupling the device to a network, a USB interface, a high-definition multimedia interface (HDMI), a peripheral component interconnect express (PCIe) interface, a display and a serial advanced technology attachment (SATA) interface.

16. The system of claim 14, wherein the device memory comprises a data structure storing a plurality of hash values that includes the hash value associated with the at least a portion of the information handling system application; and wherein, the device processor is configured to compare the hash value from the decrypted data with one or more of the plurality of hash values stored in the device memory.

17. The system of claim 14, wherein if the hash value from the decrypted data matches a hash value associated with at least a portion of the information handling system application, the device processor is configured to execute one or more instructions of the set of instructions to perform one or more of execute a previously blocked command, unlock a feature of the device, erase a portion of a non-volatile memory of the device, enable access to a data storage of the device, allow greater communication bandwidth and add a new hash value.

18. The system of claim 14, wherein, to decrypt the encrypted data to determine the decrypted data, the first device instructions are executable by the device processor to utilize a public encryption key that is associated with a private encryption key that was utilized to produce the encrypted data.

19. The system of claim 18, wherein the device instructions are executable by the device processor to:
  encrypt a session key with the public encryption key to produce an encrypted session key; and
  provide the encrypted session key to the information handling system application.

* * * * *